(12) United States Patent
Petry et al.

(10) Patent No.: US 7,761,498 B2
(45) Date of Patent: *Jul. 20, 2010

(54) ELECTRONIC DOCUMENT POLICY COMPLIANCE TECHNIQUES

(75) Inventors: Scott M. Petry, Palo Alto, CA (US); Gordon R. Irlam, Redwood City, CA (US); Brian Maggi, Mt. Prospect, IL (US)

(73) Assignee: Google Inc., Mountain View, CA (US)

( * ) Notice: Subject to any disclaimer, the term of this patent is extended or adjusted under 35 U.S.C. 154(b) by 16 days.

This patent is subject to a terminal disclaimer.

(21) Appl. No.: 11/855,016

(22) Filed: Sep. 13, 2007

(65) Prior Publication Data

US 2008/0005221 A1 Jan. 3, 2008

Related U.S. Application Data

(63) Continuation of application No. 11/276,924, filed on Mar. 17, 2006, now Pat. No. 7,277,695, which is a continuation of application No. 10/672,688, filed on Sep. 26, 2003, now Pat. No. 7,236,769, which is a continuation of application No. 09/675,609, filed on Sep. 29, 2000, now Pat. No. 6,650,890.

(51) Int. Cl.
*G06F 15/16* (2006.01)
*G08B 23/00* (2006.01)

(52) U.S. Cl. .................................. 709/201; 726/23

(58) Field of Classification Search ............. 455/412.1, 455/414.1, 413, 3, 461, 503, 3.01, 412.2; 370/468, 350–356, 458; 379/93.24, 90.01, 379/903.01, 93.01; 709/201–203, 206, 207, 709/319, 209; 726/23
See application file for complete search history.

(56) References Cited

U.S. PATENT DOCUMENTS 4,837,798 A 6/1989 Cohen et al.

(Continued)

FOREIGN PATENT DOCUMENTS

WO WO 96/35994 11/1996

(Continued)

OTHER PUBLICATIONS

Supplementary European Search Report, EP 03711094.7 dated Sep. 6, 2005.

(Continued)

*Primary Examiner*—Melody Mehrpour
(74) *Attorney, Agent, or Firm*—Baker & McKenzie LLP

(57) ABSTRACT

According to the described embodiments, an intermediate electronic messaging service is inserted into a message delivery path connecting to an e-mail entity such as an ISP. A database is provided in the intermediate service, the database having user profiles associated with the users of the ISP or other e-mail entity. The intermediate service receives email message over the electronic message delivery path into which it has been inserted, where the e-mail messages comprise at least content and IP routing information. Within the intermediate service, at least one of the content and the IP routing information of the received e-mail message is examined, and the e-mail message is then delivered to a destination based on the examination and in accordance with a user profile in the database in the intermediate service.

40 Claims, 8 Drawing Sheets

U.S. PATENT DOCUMENTS

| | | | |
|---|---|---|---|
| 5,619,648 | A | 4/1997 | Canale et al. |
| 5,627,764 | A | 5/1997 | Schutzman et al. |
| 5,634,005 | A | 5/1997 | Matsuo |
| 5,742,668 | A | 4/1998 | Pepe et al. |
| 5,771,355 | A | 6/1998 | Kuzma |
| 5,796,948 | A | 8/1998 | Cohen |
| 5,832,208 | A | 11/1998 | Chen et al. |
| 5,844,969 | A | 12/1998 | Goldman et al. |
| 5,889,943 | A | 3/1999 | Ji et al. |
| 5,905,777 | A | 5/1999 | Foladare et al. |
| 5,937,161 | A | 8/1999 | Mulligan et al. |
| 5,937,162 | A | 8/1999 | Funk et al. |
| 5,968,117 | A | 10/1999 | Schuetze |
| 5,987,611 | A | 11/1999 | Freund |
| 5,999,932 | A | 12/1999 | Paul |
| 6,014,429 | A | 1/2000 | LaPorta et al. |
| 6,023,723 | A | 2/2000 | McCormack et al. |
| 6,052,709 | A | 4/2000 | Paul |
| 6,061,718 | A | 5/2000 | Nelson |
| 6,073,165 | A | 6/2000 | Narasimhyan et al. |
| 6,075,863 | A | 6/2000 | Krishnan et al. |
| 6,092,194 | A | 7/2000 | Touboul |
| 6,112,227 | A | 8/2000 | Heiner |
| 6,118,856 | A | 9/2000 | Paarsmarkt et al. |
| 6,138,146 | A | 10/2000 | Moon et al. |
| 6,146,026 | A | 11/2000 | Ushiku |
| 6,147,987 | A | 11/2000 | Chau et al. |
| 6,178,331 | B1 | 1/2001 | Holmes et al. |
| 6,249,805 | B1 | 6/2001 | Fleming, III |
| 6,249,807 | B1 | 6/2001 | Shaw et al. |
| 6,263,202 | B1 | 7/2001 | Kato et al. |
| 6,301,245 | B1 | 10/2001 | Luzeski et al. |
| 6,317,751 | B1 | 11/2001 | Yeger et al. |
| 6,321,267 | B1 | 11/2001 | Donaldson |
| 6,334,140 | B1 | 12/2001 | Kawamata |
| 6,335,966 | B1 | 1/2002 | Toyoda |
| 6,389,276 | B1 | 5/2002 | Brilla et al. |
| 6,404,762 | B1 | 6/2002 | Luzeski et al. |
| 6,411,684 | B1 | 6/2002 | Cohn et al. |
| 6,434,601 | B1 | 8/2002 | Rollins |
| 6,438,215 | B1 | 8/2002 | Skladman et al. |
| 6,442,589 | B1 | 8/2002 | Takahashi et al. |
| 6,453,327 | B1 | 9/2002 | Nielson |
| 6,487,586 | B2 | 11/2002 | Ogilvie et al. |
| 6,513,045 | B1 | 1/2003 | Casey et al. |
| 6,574,658 | B1 | 6/2003 | Gabber et al. |
| 6,609,196 | B1 | 8/2003 | Dickinson, III et al. |
| 6,615,258 | B1 | 9/2003 | Barry et al. |
| 6,650,890 | B1 | 11/2003 | Irlam et al. |
| 6,654,787 | B1 | 11/2003 | Aronson et al. |
| 6,691,156 | B1 | 2/2004 | Drummond et al. |
| 6,711,618 | B1 | 3/2004 | Danner et al. |
| 6,721,402 | B2 * | 4/2004 | Usami ............... 379/93.24 |
| 6,779,021 | B1 | 8/2004 | Bates et al. |
| 6,868,498 | B1 | 3/2005 | Katsikas |
| 7,016,992 | B2 * | 3/2006 | Yamamuro et al. ......... 710/100 |
| 7,120,865 | B1 * | 10/2006 | Horvitz et al. ............ 715/210 |
| 7,133,660 | B2 | 11/2006 | Irlam et al. |
| 7,272,378 | B2 | 9/2007 | Irlam et al. |
| 7,277,695 | B2 * | 10/2007 | Petry et al. ............. 455/414.1 |
| 7,428,410 | B2 | 9/2008 | Petry et al. |
| 2001/0032095 | A1 | 10/2001 | Balbach |
| 2002/0035501 | A1 * | 3/2002 | Handel et al. ................ 705/10 |
| 2002/0059454 | A1 | 5/2002 | Barrett et al. |
| 2005/0182959 | A1 | 8/2005 | Petry et al. |
| 2006/0265459 | A1 | 11/2006 | Petry et al. |

FOREIGN PATENT DOCUMENTS

| | | |
|---|---|---|
| WO | WO 97/12321 | 4/1997 |
| WO | WO 97/27546 | 7/1997 |
| WO | WO 98/37680 A2 | 8/1998 |
| WO | WO 99/06929 | 2/1999 |
| WO | WO 99/65256 | 12/1999 |
| WO | WO 99/67731 | 12/1999 |
| WO | WO 00/42747 | 7/2000 |
| WO | WO 00/49776 | 8/2000 |
| WO | WO 01/46867 | 6/2001 |
| WO | WO 02/08938 | 1/2002 |

OTHER PUBLICATIONS

European Examination Report, EP 01977347.2 dated Aug. 26, 2005.
"Automated Spam Detection" R. Lonn, Feb. 16, 1999.
http://web.archive.org/web/20000815053401/www.brightmail.com/corporate/overview/.
http://web.archive.org/web/19990128140052/http://www.chooseyourmail.com/.
http://web.archive.org/web/20000815064559/www.commtouch.com/solutions/index.shtml.
http://web.archive.org/web/20001205151400/mailcircuit.com/route.htm.
http://web.archive.org/web/20000824040241/www.messagelabs.com/about/Overview/Overview.htm.
http://web.archive.org/web/20000816134259/www.antivirus.com/products/email-groupware.htm.
International Search Report, Form PCT/ISA/210 dated Apr. 14, 2004, PCT Application No. PCT/US03/04757.
EMC News Release, "EMC Launches Centera, Ushers in New Era of Content-Addresses Storage," New York, Apr. 29, 2002. www.emc.com/news/press_releases/view.jsp?id=1254.
CVS.SOURCEFORGE.NET "Spam Filtering ESMTP Demon", copyright notice dated 2000, publ. at http://cvs.sourceforge.net/viewcvs.py/clocc/clocc/src/donc/smt-p. lisp?rev=1.4.
Bounce Spam Mail, from Albert Yale Software, dated 1997-2000.
CSM Internet Mail Scanner, from CSM-USA, Inc., dated 1999.
CyberSitter AntiSpam, from CyberSitter.com, distributed by Solid Oak Software, circa 1999-2000.
DL MailFilter, from DeadLetter and Leem Han Cheong, dated Nov. 1999.
E-Mail Chompaer, from Lorenzo Pasqualis, dated 1996-97.
E-Mail Remover, from Victor Javier, Virtual Network, Inc., Singapore, dated Mar.-Jul. 1998, and 1999.
FlameThrower, from Eagle Research, Inc., dated 2000.
Interceptor, from Grok Development Ltd., dated 1999-2000.
JOC E-Mail Checker, from JOCSoft and Jose Olice Civit, dated 2000.
Lyris MailShield, from Lyris, undated.
Quickhead-E, from Danere Software Innovations, dated Mar. 2000.
Spam Attack Pro, circa 1996-97, from softwiz.com.
Spam Buster, from Contact Plus Corp., dated 2000.
SpamEater, from High Mountain Software, dated 1997-2000.
BrightMail, from BrightMail, Inc., dated 1997-2000.
Praetor, from Computer Mail Services, Inc., circa 1998-1999.
"MsgTo.com Stops Spam Email", web page circa Nov. 19, 1999, from www.applesforhealth.com.
"The Species Filter", by Rafe Needleman, ed., dated Aug. 6, 1999, from www.RedHerring.com.
Official Sep. 1999 AUP (Auto Update Program) v5.0 Build 447, Product Updated Release, winserver.com.
Supplementary European Search Report, EP 01977347 dated Apr. 7, 2005.
Records/Archives in the News, http://listserv.muohio.edu/scripts/wa.exe?A2=ind9901e&L-archives&T=0&F=&S=&P=6980, Jan. 1999, pp. 5-6.
Allegro in the News, Mail.com's Allegro Subsidiary Surpasses 200,000 Corporate Users of its Mailzone Service, http://web.archive.org/web/20040617033735/www.allegro-group.com/news/083199.html, Aug. 31, 1999.
MailZone Managed Messaging, MailWatch Next Generation of Mailzone Email Firewall Service is Released, http://web.archive.org/web/19990504151725/http://www.mailzone.net, 2000.
EPO 07003732.0, Supplemental Search Report dated Jul. 6, 2007.

* cited by examiner

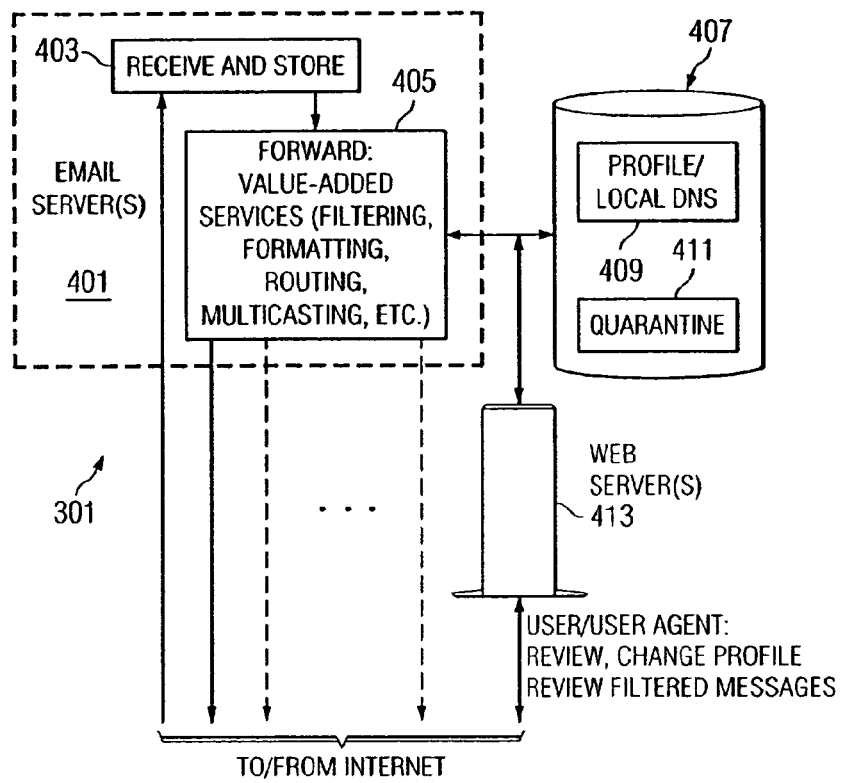
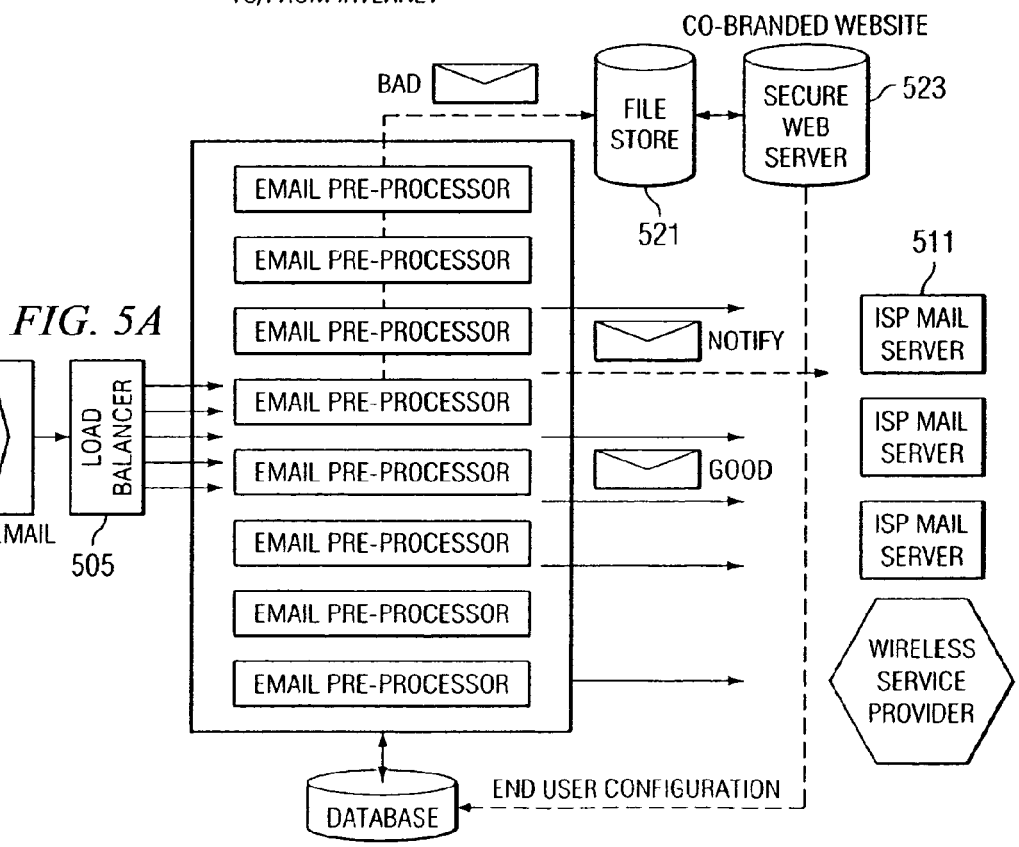

ELECTRONIC DOCUMENT POLICY COMPLIANCE TECHNIQUES

CROSS-REFERENCE TO RELATED APPLICATION

This application is a continuation of application Ser. No. 11/276,924, filed Mar. 17, 2006, which is a continuation of application Ser. No. 10/672,688, filed Sep. 26, 2003, now U.S. Pat. No. 7,236,769, issued Jun. 26, 2007, which is a continuation of application Ser. No. 09/675,609, filed Sep. 29, 2000, now U.S. Pat. No. 6,650,890, issued Nov. 18, 2003. All of these disclosures are commonly assigned with the present application and incorporated herein by reference for all purposes.

FIELD OF ACTIVITY

Disclosed embodiments herein relate generally to electronic messaging, and more particularly to value-added electronic messaging services and techniques for monitoring of email policy compliance.

BACKGROUND

The adoption of e-mail has occurred at an unprecedented pace. Of routine computer users, most now have or soon will have an e-mail address. Many have more than one e-mail address, e.g., one for work and another for home. E-mail offers unparalleled convenience of written communication.

Because of the resources required to install and maintain an e-mail server, various companies have emerged offering e-mail outsourcing in which the e-mail server is provided by a third party outside the organization. E-mail outsourcing off-loads the responsibility for providing and maintaining e-mail service without necessitating any change in domain or e-mail addresses. In an outsourcing approach, E-mail is retrieved from an off-site e-mail server provided and maintained by the e-mail outsourcing company.

Lacking in the prior art is a way to deliver messages to various destinations according to "policy" decisions, which is to say decisions based on configured profiles. Further lacking is a way to make such policy decisions on a user-by-user basis in a managed email service.

SUMMARY OF THE INVENTION

Disclosed are techniques for monitoring e-mail policy compliance. Specifically disclosed is an electronic messaging service operating on behalf on an ISP or other e-mail entity operable to send and receive messages on behalf of its users over electronic message delivery paths between the e-mail entity and sending and receiving servers.

According to the described embodiments, the intermediate electronic messaging service is inserted into at least one of the electronic message delivery paths by changing an MX record in a DNS database containing an IP address of a mail server of the email entity to contain an IP address for the intermediate mail service. A database is further provided in the intermediate service, the database having user profiles associated with the users of the e-mail entity. The intermediate service then receives email messages over the at least one electronic message delivery path into which it has been inserted, where the e-mail message comprises at least content and IP routing information. Within the intermediate service, at least one of the content and the IP routing information of the received e-mail message is examined, and the e-mail message is then delivered to a destination based on the examination and in accordance with a user profile in the database in the intermediate service.

In further accordance with the disclosed embodiments, an intermediate electronic messaging service may perform value-added processing on the electronic message, apply user-based policy decisions, which include the routing of emails to certain destinations based on policy decisions according to a user profile. These policy decisions are executed, for example, by application of e-mail filters to the electronic messages, application of virus checkers for checking the electronic message and attachments in the electronic message, blocking e-mails based on content and IP routing information, delivery of normal "clean" e-mails, and holding of "suspected" e-mails in a quarantine area where notifications may be generated and sent according to the configurable profiles. Such policy decisions, in other words, typically deliver "good" emails, or emails complying with policy, as addressed, whereas "bad" emails, or emails conflicting with policy, are redirected or quarantined.

The foregoing has outlined preferred and alternative features of various embodiments of the disclosed principles so that those skilled in the art may better understand the detailed description that follows. Additional features will be described hereinafter that form the subject of the claims appended herein. Those skilled in the art should appreciate that they can readily use the disclosed conception and specific embodiments as a basis for designing or modifying other structures for carrying out the same purposes of the disclosed principles. Those skilled in the art should also realize that such equivalent constructions do not depart from the spirit and scope of the disclosed principles.

BRIEF DESCRIPTION OF THE DRAWINGS

The disclosed principles may be further understood from the following description in conjunction with the appended drawings. It is emphasized that various features may not be drawn to scale. In fact, the dimensions of various features may be arbitrarily increased or reduced for clarity of discussion. In addition, it is emphasized that some components may not be illustrated for clarity of discussion. In the drawings:

FIG. 4 is a block diagram of one embodiment of the intermediate server(s) of FIG. 3;

FIG. 5A is a more detailed block diagram of one embodiment of the server of FIG. 4;

DETAILED DESCRIPTION

Figure 3:
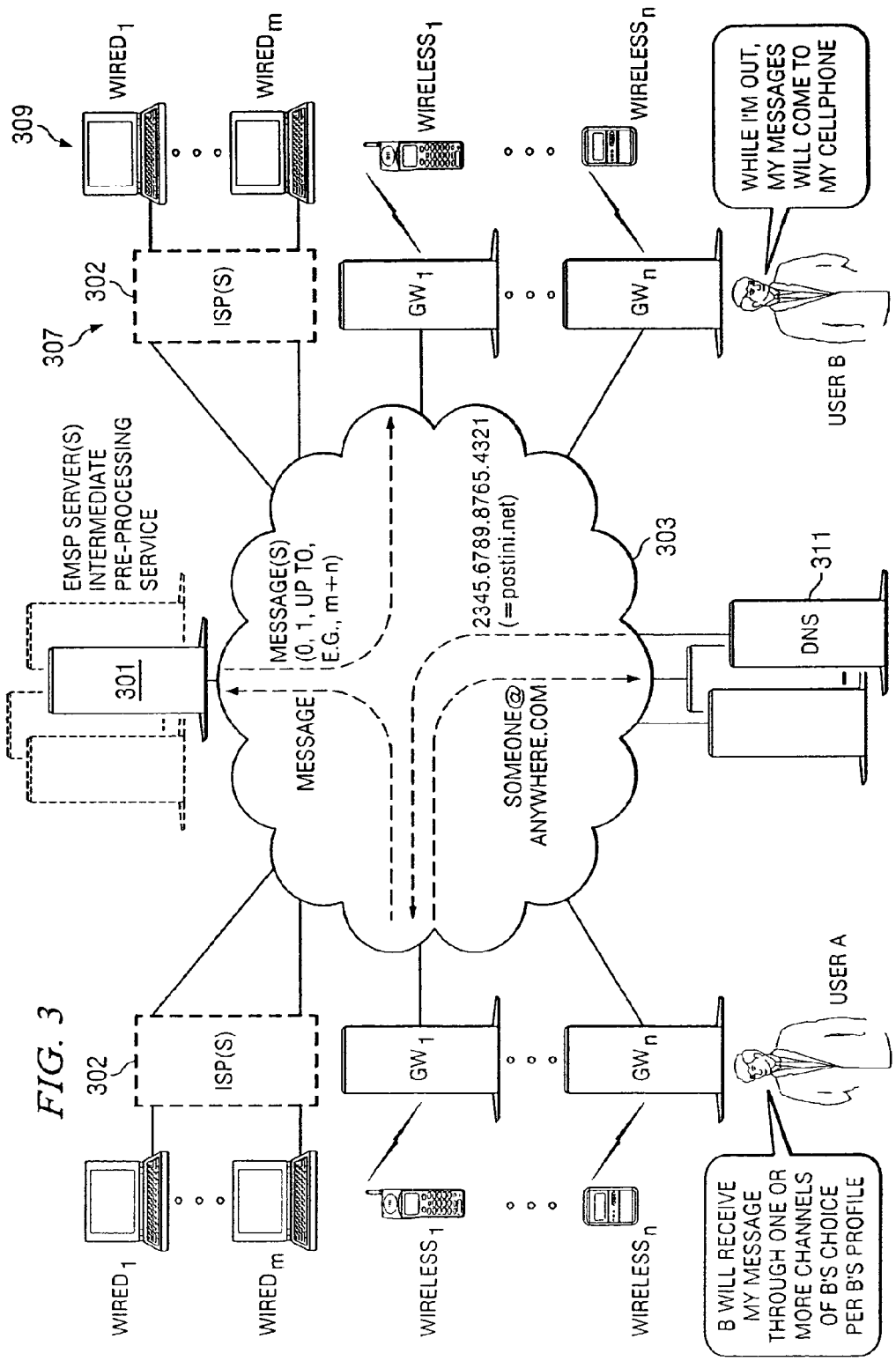
FIG. 3 is a diagram of one embodiment of a unified message delivery system.

Referring now to FIG. 3, a diagram is shown of one embodiment of a unified message delivery system. The system provides for a service that allows the user to define where messages are routed across multiple devices, which portions of messages are routed to which devices, etc. The system allows for ready integration with an end-user's primary e-mail service and is end-user configurable.

Figure 1:
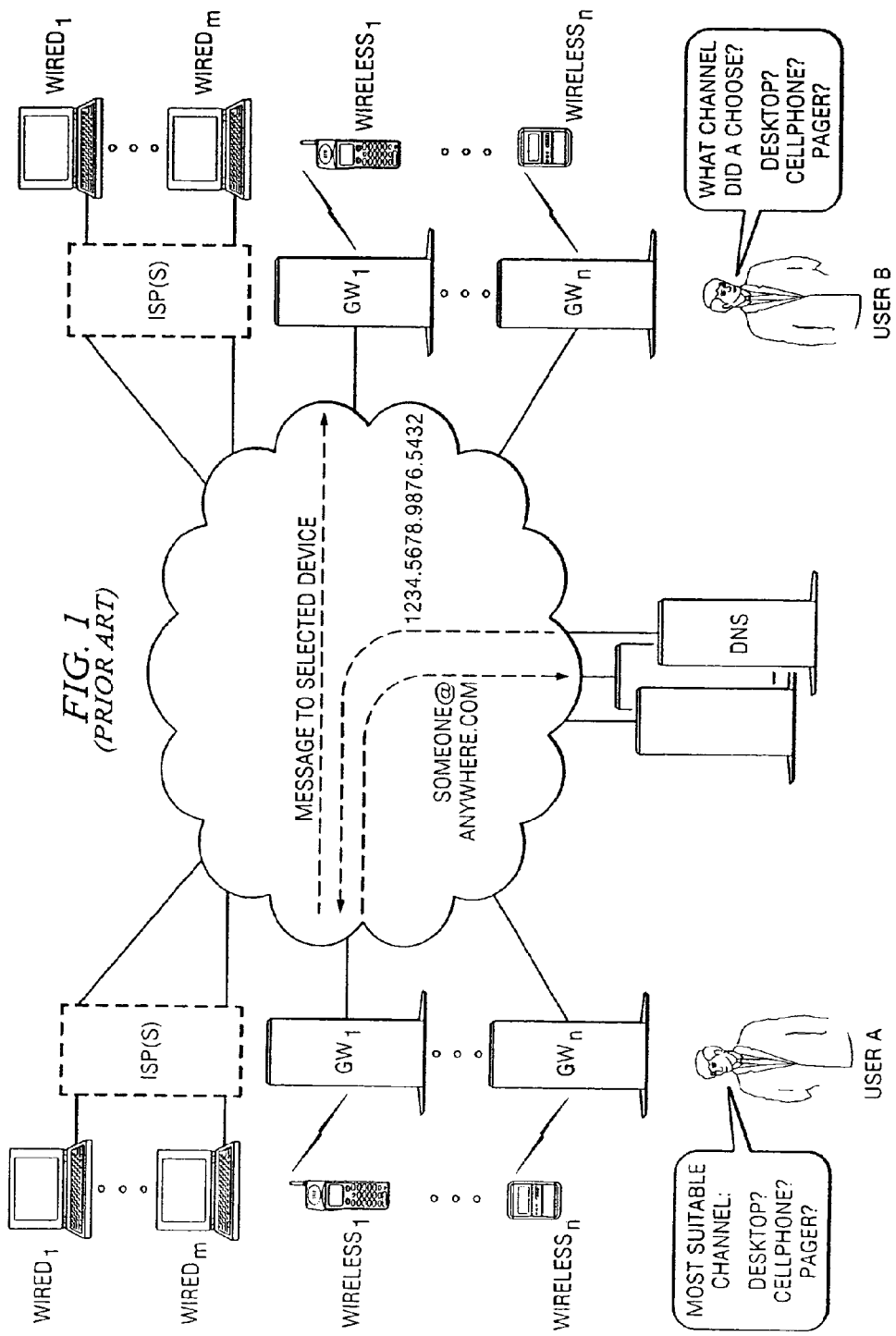
FIG. 1 is a diagram illustrating the multiple e-mail box conundrum.
Figure 2:
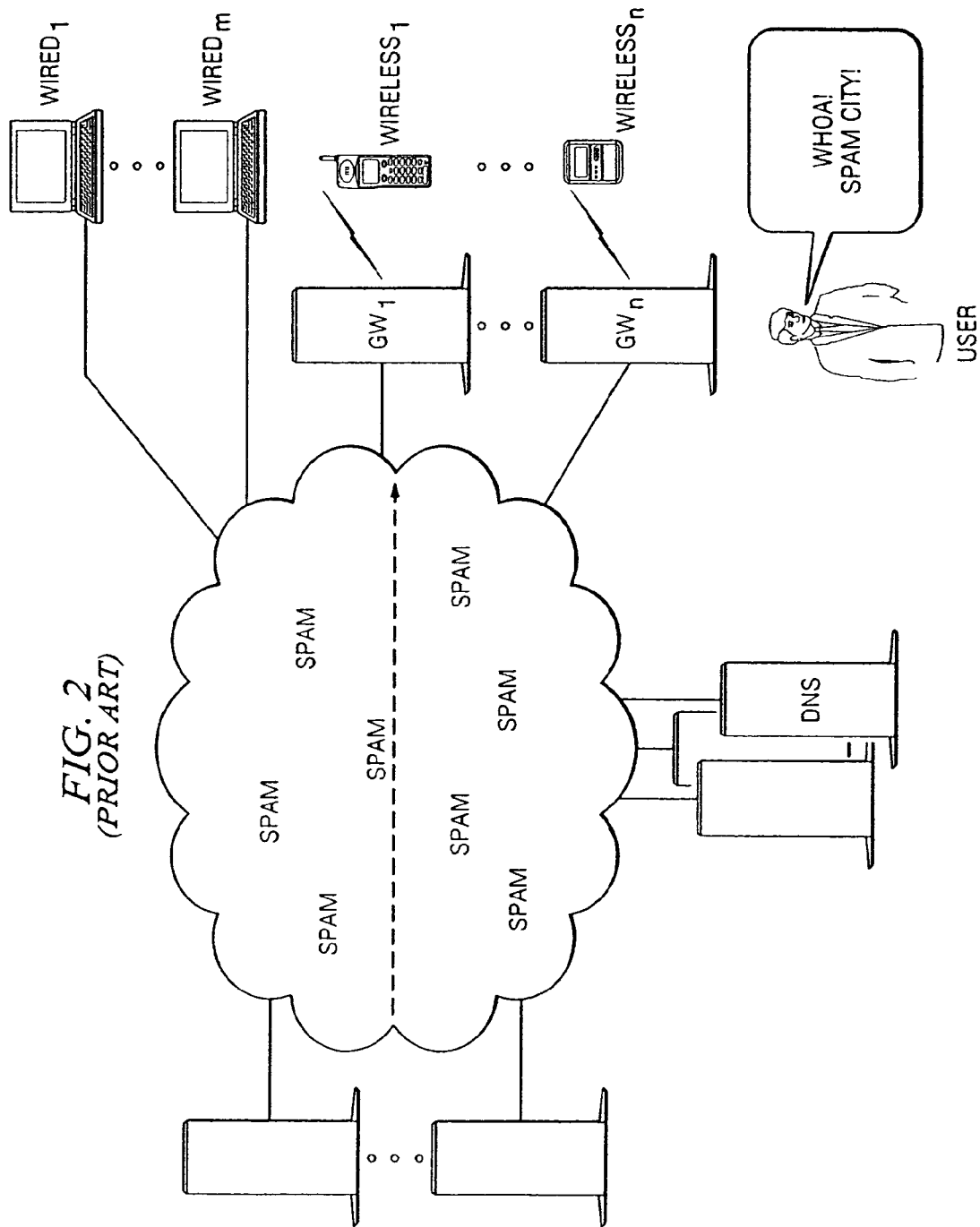
FIG. 2 is a diagram illustrating "spamming" of the user of FIG. 1.

As compared to FIG. 1, in which the electronic message delivery path proceeds through the Internet directly to one of a multiplicity of servers or gateways, in the system of FIG. 3, an intermediate pre-processing service 301 is inserted into the message delivery path. The intermediate pre-processing service 301 preferably comprises an NOC including an array of mail handling machines, a database, a file store, web servers and utility machines. The intermediate pre-processing service 301 is in turn connected to the various servers and gateways of FIG. 1, including, for example, a user's primary ISP 303, if any. Such connection typically also occurs through the Internet (305). The collection of servers and gateways 307 provide e-mail access for a variety of wired and wireless client devices 309, which may include, for example, a main e-mail system (typically a home or office desktop computer), a free web-based mail system (e.g., Yahoo or the like), a PDA (e.g., Palm VII), a cell phone and a pager. A typical user will use two or more of the foregoing electronic message delivery options and some users will use most or all of these options.

By established user-defined preferences, the user is able to control the flow of messages to the various devices. Preferences are configured using web browser software to create or modify a user profile. User profiles are stored in a relational database (not shown) accessible to the intermediate pre-processing service. Note that end-user configuration may occur via any web-enabled device, either wired or wireless. Wireless web access may be supported using technologies presently-known in the art such as Palm's "web clipping" technologies, the UPLink server suite of Phone.com of Redwood City, Calif., Wireless Application Protocol (WAP)-enabled cellphones, etc.

To take a concrete example, there may be three e-mail messages delivered to the intermediate pre-processing service 301 for a particular user, an urgent message, a message from the user's boss, and a message from the user's friend. In this example, the e-mail from the user's friend might be delivered to the user's main e-mail system and to the user's free web mail system. The e-mail from the user's boss might be delivered to the user's PDA. The urgent message might be delivered to the user's cell phone and to the user's pager.

FIG. 3 illustrates the different manner of operation of the message delivery system of FIG. 3, including the intermediate pre-processing service 301, as compared to the conventional electronic message delivery path of FIG. 1. Say, for example, that user A, (e.g., Sue@standford.edu) wishes to send an e-mail to user B (e.g., Tom@aol.com). Sue uses an e-mail program to create, address and send the e-mail. The mail is sent from Sue's computer to the local mail server for Sue's computer, which may reside on Sue's local area network or at an ISP. The local mail server queries a Domain Name Server (DNS) 311 to obtain the IP address for Tom@aol.com. Normally, the local mail server uses the IP address returned by DNS to send the e-mail to the destination e-mail server for Tom's computer, (e.g., mail.aol.com). The e-mail is then delivered to Tom's computer.

In one embodiment of the present system, the normal electronic message delivery path is broken and the intermediate pre-processing service 301 is inserted into the electronic message delivery path. This result is easily accomplished by modifying the appropriate DNS record (such as the MX—mail exchange—record, for example) to point to the intermediate pre-processing service 301 instead of the destination e-mail server (e.g., 303). In this manner, the electronic message delivery path is modified such that the intermediate pre-processing service 301 handles all of the electronic messages that would otherwise have been handled by the destination e-mail server.

Given the ease with which the intermediate pre-processing service may be inserted into the message delivery path, the enrollment of ISPs in cooperative messaging service agreements with the operator of the intermediate pre-processing service (Electronic Messaging Service Provider, or EMSP) may be automated to a great extent. For example, the ISP may visit the web site of EMSP, indicate assent to terms and conditions, and specify billing information and a service start date.

Prior to the service start date, the ISP advises subscribers and arranges for its DNS entries to be modified appropriately as of the service start date.

Prior to the start date, users are advised by e-mail of additional available message center services. Each user is assigned a user name and password in order to access a message center web site. When the user first visits the message center web site, the user creates a profile that will be used thereafter to select and configure value-added service (e.g., junk e-mail filtering and virus checking) and to control message delivery. Within the profile, the user may designated a particular e-mail server as the user's main e-mail system. Profiles place users in control of their mail experience. Alternatively, A service provider can create a default profile of services and the user can visit the message center web site to modify the default configuration.

When the intermediate pre-processing service 301 receives an e-mail, it look ups the addressee's user profile. The intermediate pre-processing service then performs value-added processing of the message. For example, the intermediate pre-processing service may apply user-selected junk e-mail filters and user-selected virus checkers for checking attachments. Junk-e-mail blocking may be based on both content and IP routing information. "Clean" e-mail is delivered to the user's mail server as normal. Suspect messages, instead of being deleted without notification to the user, are held in a quarantine area, and the user is notified. The user can then, if desired, download messages flagged as suspect by accessing the message center web site.

Alternatively or in addition, the intermediate pre-processing service may deliver to the message to one or more wireless devices in accordance with the user profile, e.g., by forwarding the message to one or more servers or gateways 307 the addresses of which have been specified by the user in the user's profile. Prior to forwarding the message to a server or gateway, the intermediate pre-processing service 301 may perform any necessary reformatting to meet the requirements of a particular recipient device.

In general, a user may configure an arbitrary number of communication "channels," each channel including a destination and, optionally, one or more message modification procedures including filters, reformatters, etc. that may affect message presentation, be required for message transport, etc.

The intermediate pre-processing service 301 may perform myriad other types of services. One example of such services involves certain attachments, e.g., rich media items such as MP3, JPEG, MPEG, etc. Such items are notorious "bandwidth hogs" and can easily clog up the message delivery system. Rather than simply delete such items, however, the intermediate pre-processing service 301 allows such items to be intelligently managed. One option is to treat rich media in like manner as junk e-mail. That is, rich media items, instead of being delivered with the e-mail messages to which they are attached, are delivered to the message center web site, and the user is notified. The user can then view/play or ignore the items as desired.

Another option is to produce replacement attachments, i.e., "thumbnail" versions of the rich media items. An option may be provided for the original full attachment(s) to be delivered to the user with a subsequent system-generated e-mail message. For example, a link may be embedded in the thumbnail along with appropriate text advising the user to click on the link to receive the full attachment. In one embodiment, clicking on the link takes the user to a complete, high-resolution image residing in the user's personal message center.

Note that the functionality of the intermediate pre-processing service may be implemented at ISPs rather than at a central NOC without any sacrifice of functionality or any noticeable effect on the end user. In this instance, DNS information remains unchanged. In this scenario, however, ISPs must be persuaded to invest in additional hardware and/or software.

Referring to FIG. 4, a generalized block diagram is shown of one embodiment of the intermediate pre-processing service 301 of FIG. 3. One or more messaging servers 401, e.g., e-mail servers, are provided, realizing a receive and store function 403 and a forward function 405. The forward function incorporates various value-added services such as filtering, formatting, routing, multicasting, etc. Due to the multicasting feature of the forward block 405, a single incoming message may result in the forwarding of some greater number of outgoing messages.

The forward block 405 communicates with storage 407, which may include one or more relational databases or file servers. Storage 407 includes profile and local DNS information 409 for each subscriber, as well as a "quarantine" area 411 for storing filtered messages, e.g., messages determined to be unfit to forward. Subscribers are provided access to storage 407 through one or more web servers 413, allowing subscribers to configure their profiles, view filtered messages, etc.

Referring to FIG. 5A, a more detailed block diagram is shown of the intermediate pre-processing service 301 in accordance with an exemplary embodiment of the invention. Multiple hosts are defined on both the inbound mail server and the outbound mail server. Each host runs a copy of an appropriate mail program such as FreeBSD Qmail. In one alternate embodiment, a machine or a cluster of machines operates as a mail-receiving machine and a mail-delivering machine. This machine will accept a connection from a sending SMTP server and begin receiving data. Simultaneously, the machine will begin receiving the message data, querying the database for a specific user configuration, processing messages based on configuration, opening a connection to a receiving SMTP server, and delivering it. Standard mail server software is not required for this alternate embodiment.

Incoming mail is routed to an available host by a load balancer 505, or load-sharing switch/router, of a type commonly available from Cisco and other network equipment manufacturers. The server cluster 501 can include a server running a relational database management system such as Oracle, for example. The host queries the database to identify the user and user preferences. The host then processes the message as specified in the user profile. For spam checking, each host runs a copy of an appropriate spam filter. Virus checking can be done using a virus scanning application such as that available from Trend.

Good e-mails are addressed with one or more addresses in accordance with information specified in the user profile and sent to the outbound mail server cluster to be sent out. To deliver a message addressed to user@isp.com, our intermediate preprocessing lookup service looks up user@postini-mail.isp.com and delivers. This allows the ISP to update the final delivery location without requiring the intermediate pre-processing service to make any changes. The e-mail is sent to the ISP mail server 511 and possibly to other servers or gateways in accordance with the user profile.

Bad e-mails are saved "in quarantine" on a message center web site, and a notification e-mail is sent to the user. In the illustrated embodiment, the inbound mail server cluster is connected to a file store 521. The file store is in turn connected to a web server 523. When a user logs on to the web server, a web page is displayed that includes a link for displaying a summary of quarantined messages and/or attachments. By clicking on a selected item, the user is able to view the item and, depending on the attachment type, may be able to view the attachment. If the user so chooses, the user may be allowed to download an item suspected to contain a virus after the user has been given appropriate warning.

Figure 5B:
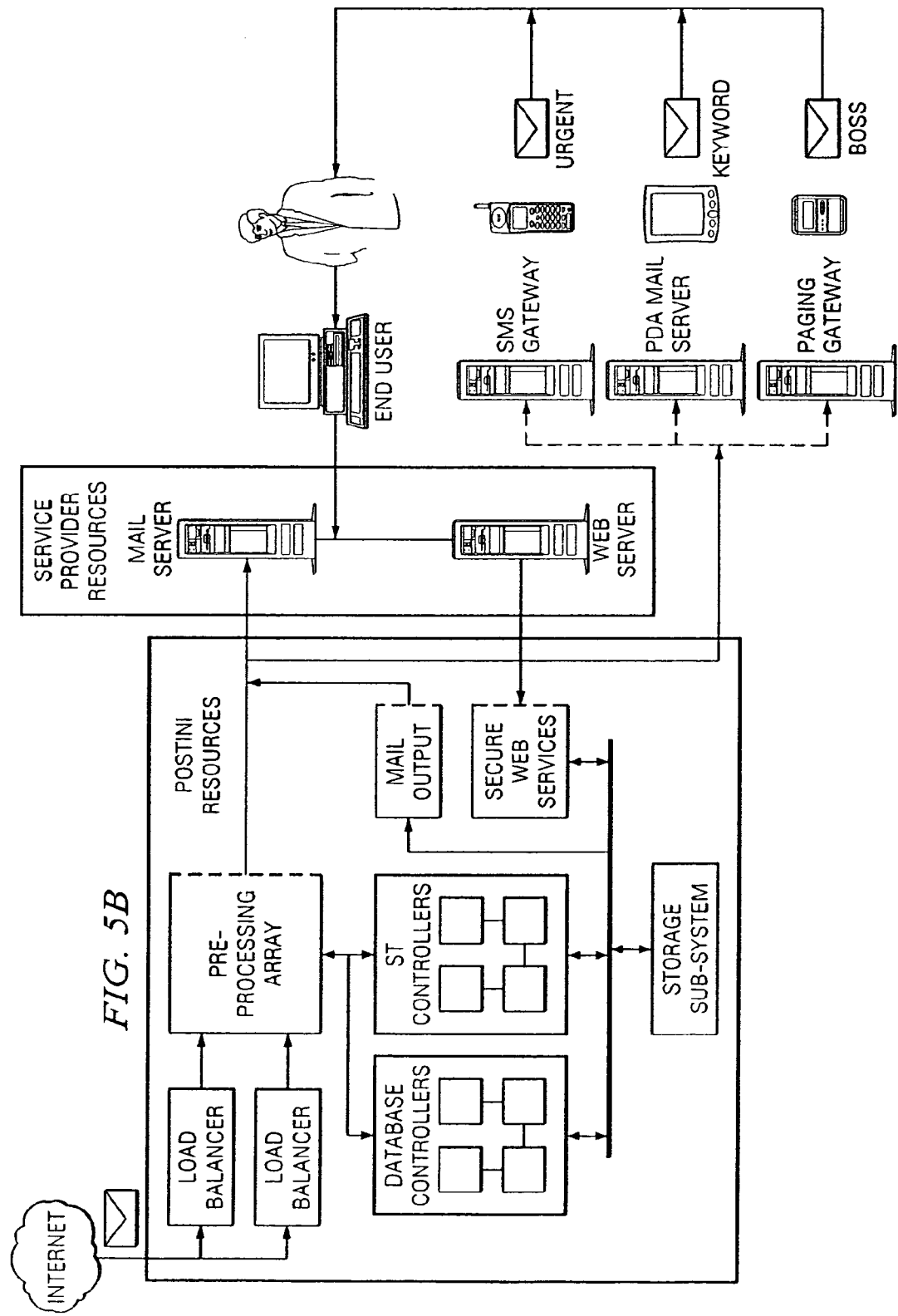
FIG. 5B is an alternate diagram of one embodiment of the server of FIG. 4.

FIG. 5B shows an alternate diagram of a system of the present invention.

Figure 6A:
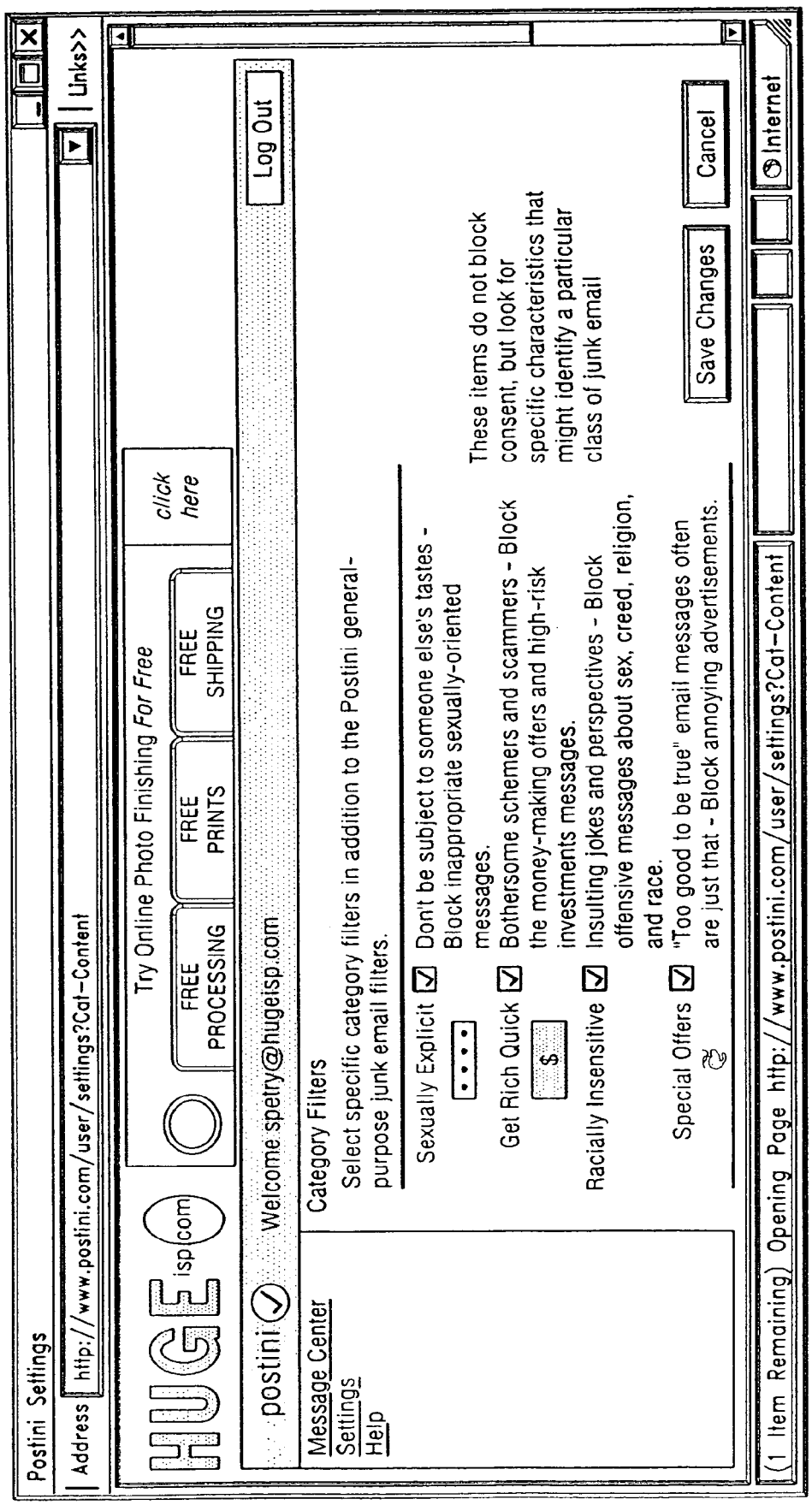
FIG. 6 is a diagram of an exemplary embodiment showing a configuration screen display that may be used to configure the unified message delivery system.
Figure 6B:
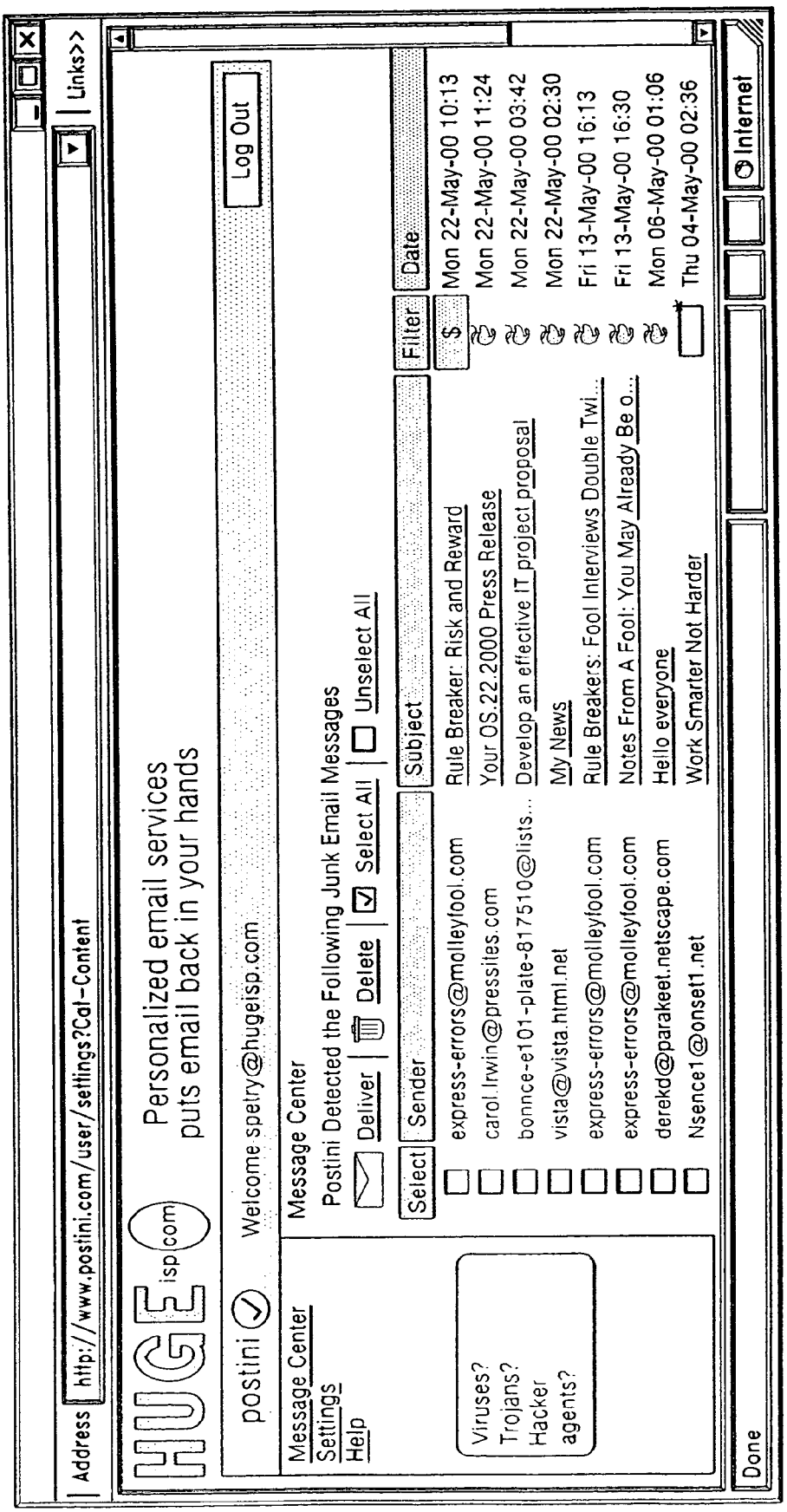

FIG. 6 shows an example of a web form screen display that may be filled out by the user to configure message delivery for that user and subsequently modified to modify the configuration. In the example shown, a subsequent screen display is shown after one of the mail filter items is selected.

In accordance with a further feature of the invention, devices may be provided with a background software routine that periodically notifies the messaging system, automatically, of the time of last user input to the device. This information may be used to dynamically route messages to increase the likelihood of early receipt by the user. For example, a user may specify messages to normally be delivered to the user's cellphone between the hours of 8-9 AM, 12-1 PM and 6-7 PM, and to the user's work between the hours of 9-12 AM and 1-6 PM, in accordance with the user's normal routine. On a particular afternoon, however, the user may be away from the office and may have used his/or her cellphone to receive or make one or more calls, or to access information, etc. If the user has selected a "find me" configuration option, then this usage information may be used to intelligently route messages to the user's cellphone, for example.

The value-added electronic messaging system detailed in the foregoing description provides an elegant solution to the multiple e-mail box conundrum. User-centric in design, the system is end-user configurable and uses an intuitive web metaphor. Based on a scalable architecture, the system works with existing e-mail accounts and does not require hardware or software integration.

Figure 7:
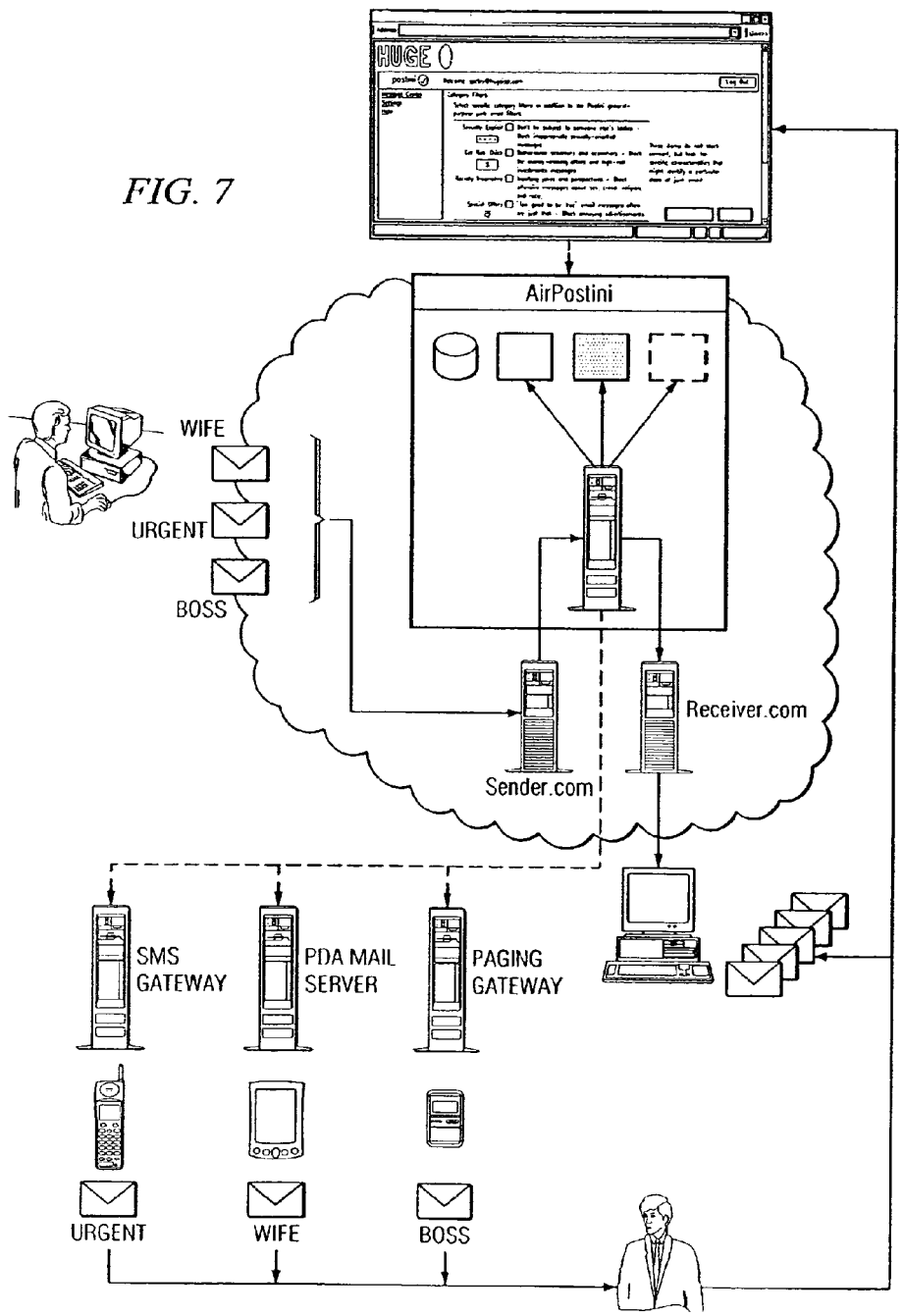
FIG. 7 is a diagram emphasizing end user configuration and mail processing.

FIG. 7 is a diagram of one embodiment of the system of the present invention emphasizing end user configuration and mail processing.

It will be appreciated by those of ordinary skill in the art that systems and methods employing the disclosed principles can be embodied in other specific forms without departing from the spirit or essential character thereof. The presently disclosed embodiments are therefore considered in all respects to be illustrative and not restrictive. The scope of the disclosed principles is indicated by the appended claims rather than the foregoing description, and all changes that come within the meaning and range of equivalents thereof are intended to be embraced therein.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method of providing electronic document services in a computer network comprising a document management entity operable to provide electronic documents to users over electronic document delivery paths between the document management entity and document users, the method comprising:
   providing a document management entity remote from the users' servers and connected to the users' servers through the Internet;
   providing a database associated with the document management entity, the database having user profiles associated with one or more of the users;
   storing an electronic document in the document management entity, the stored electronic document addressed to at least one of the one or more users and transmitted across the Internet from a sending server at a source of the electronic document;
   determining an IP address of the source for the stored electronic document;
   examining at least one of the electronic document content and the electronic document source; and
   processing the electronic document and determining options for providing access to or delivering the processed electronic document to the one or more users, both based on the examination of the at least one of the electronic document content and the electronic document source, and further in accordance with the user profile of the one or more users.

2. A method according to claim 1, wherein the processing further comprises notifying the one or more users of the storing of the electronic document in the document management entity.

3. A method according to claim 1, wherein the processing further comprises providing access to the electronic document to the one or more users via the document management entity.

4. A method according to claim 3, wherein providing access further comprises providing access via the Internet.

5. A method according to claim 1, wherein the processing further comprises delivering the entire electronic document to the one or more users.

6. A method according to claim 1, wherein the processing further comprises delivering a hyperlink to the stored electronic document to the one or more users.

7. A method according to claim 1, wherein the processing comprises processing the electronic document source according to rules in the user profile of the one or more users to whom the electronic document is addressed that are established by the one or more users.

8. A method according to claim 1, wherein the examining comprises examining the at least one of the electronic document content and electronic document source according to rules in the user profile.

9. A method according to claim 1, wherein the processing further comprises delivering different portions or versions of the electronic document to the one or more users.

10. A method according to claim 1, wherein the processing further comprises identifying a media part of the stored electronic document, modifying the electronic document by substituting different electronic content for the media part, and delivering the modified electronic document to the one or more users.

11. A method according to claim 10, wherein the different electronic content is derived from the media part.

12. A method according to claim 10, wherein the different electronic content is descriptive of the media part.

13. A method according to claim 1, wherein the processing further comprises formatting at least a portion of the electronic document in accordance with a receiving device of the one or more users, and providing the at least a portion of the electronic document to that receiving device.

14. A method according to claim 1, wherein the document management entity creates the user profile.

15. A method according to claim 1, wherein the user profile is modifiable by a user who is an intended recipient of the stored electronic document.

16. A method according to claim 1, wherein the examining further comprises filtering the stored electronic document, and wherein the processing further comprises storing filtered documents determined to be malicious in a quarantine area.

17. A method according to claim 16, further comprising sending a notification to the one or more users regarding the storing of the malicious electronic document in the quarantine area.

18. An electronic document system for managing electronic documents in a computer network, the system comprising:
   a document management entity operable to provide electronic documents to users over electronic document delivery paths between the document management entity and document users, the document management entity remote from the users' servers and connected to the users' servers through the Internet;
   a database associated with the document management entity, the database having user profiles associated with one or more of the users and configured to store in the document management entity an electronic document addressed to at least one of the one or more users and transmitted across the Internet from a sending server at a source of the electronic document; and
   wherein the document management entity comprises an electronic document processor configured to:
      determine an IP address of the source for the stored electronic document,
      examine at least one of the electronic document content and the electronic document source, and
      process the electronic document and determine options for providing access to or delivering the processed electronic document to the one or more users, both based on the examination of the at least one the electronic document content and the electronic document source, and further in accordance with the user profile of the one or more users.

19. A system according to claim 18, wherein the electronic document processor is further configured to notify the one or more users of the storing of the electronic document in the document management entity.

20. A system according to claim 18, wherein the electronic document processor is further configured to provide access to the electronic document to the one or more users via the document management entity.

21. A system according to claim 20, wherein providing access comprises providing access via the Internet.

22. A system according to claim 18, wherein the electronic document processor is further configured to deliver the entire electronic document to the one or more users.

23. A system according to claim 18, wherein the electronic document processor is further configured to deliver a hyperlink to the stored electronic document to the one or more users.

24. A system according to claim 18, wherein the electronic document processor is further configured to process the electronic document source according to rules in the user profile of the one or more users to whom the electronic document is addressed that are established by the one or more users.

25. A system according to claim 18, wherein the processing by the electronic document processor further comprises examining the at least one of the electronic document content and electronic document source according to rules in the user profile.

26. A system according to claim 18, wherein the processing by the electronic document processor further comprises delivering different portions or versions of the electronic document to the one or more users.

27. A system according to claim 18, wherein the processing by the electronic document processor further comprises identifying a media part of the stored electronic document, modifying the electronic document by substituting different electronic content for the media part, and delivering the modified electronic document to the one or more users.

28. A system according to claim 27, wherein the different electronic content is derived from the media part.

29. A system according to claim 27, wherein the different electronic content is descriptive of the media part.

30. A system according to claim 18, wherein the processing by the electronic document processor further comprises formatting at least a portion of the electronic document in accordance with a receiving device of the one or more users, and providing the at least a portion of the electronic document to that receiving device.

31. A system according to claim 18, wherein the document management entity creates the user profile.

32. A system according to claim 18, wherein the user profile is modifiable by a user who is an intended recipient of the stored electronic document.

33. A system according to claim 18, wherein the examining by the electronic document processor further comprises filtering the stored electronic document, and wherein the processing by the electronic document processor further comprises storing filtered documents determined to be malicious in a quarantine area.

34. A system according to claim 33, wherein the electronic document processor is further configured to send a notification to the one or more users regarding the storing of the malicious electronic document in the quarantine area.

35. A method of providing electronic document services in a computer network comprising a document management entity operable to provide electronic documents to users over electronic document delivery paths between the document management entity and document users, the method comprising:
  providing a document management entity remote from the users' servers and connected to the users' servers through the Internet;
  providing a database associated with the document management entity, the database having user profiles associated with one or more of the users;
  storing an electronic document in the document management entity, the stored electronic document addressed to at least one of the one or more users and transmitted across the Internet from a sending server at a source of the electronic document;
  determining an IP address of the source for the stored electronic document;
  examining at least one of the electronic document content and the electronic document source;
  processing the electronic document based on the examination of the at least one the electronic document content and the electronic document source, and further in accordance with the user profile of the one or more users to whom the document is addressed;
  delivering a hyperlink to the stored electronic document to the one or more users;
  providing access via the document management entity to the electronic document to the one or more users that click on the hyperlink; and
  determining options for providing access to or delivering the entire electronic document to the one or more users that clicked on the hyperlink also based on the examination of the at least one the electronic document content and the electronic document source, and further in accordance with the user profile of the one or more users.

36. A method according to claim 35, wherein providing access further comprises providing access via the Internet.

37. A method according to claim 35, wherein the processing comprises processing the electronic document source according to rules in the user profile of the one or more users to whom the electronic document is addressed that are established by the one or more users.

38. A method according to claim 35, wherein the examining comprises examining the at least one of the electronic document content and electronic document source according to rules in the user profile.

39. A method according to claim 35, wherein the processing further comprises formatting at least a portion of the electronic document in accordance with a receiving device of the one or more users, and providing the at least a portion of the electronic document to that receiving device.

40. A method according to claim 35, wherein the examining further comprises filtering the stored electronic document, and wherein the processing further comprises storing filtered documents determined to be malicious in a quarantine area.

* * * * *